(12) United States Patent
Li et al.

(10) Patent No.: US 10,996,123 B2
(45) Date of Patent: May 4, 2021

(54) METHOD FOR DETERMINATION OF INTERNAL UNIAXIAL STRESS OF STEEL MEMBER BASED ON PHASE SPECTRUM OF ULTRASONIC TRANSVERSE WAVE

(71) Applicant: Harbin Institute of Technology, Shenzhen, Guangdong (CN)

(72) Inventors: Zuohua Li, Guangdong (CN); Diankun Liu, Guangdong (CN); Nanxi Liu, Guangdong (CN); Yingzhu Wang, Guangdong (CN); Jun Teng, Guangdong (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 0 days.

(21) Appl. No.: 16/716,510

(22) Filed: Dec. 17, 2019

(65) Prior Publication Data

US 2020/0209078 A1    Jul. 2, 2020

(30) Foreign Application Priority Data

Dec. 27, 2018 (CN) .......................... 201811615656.9

(51) Int. Cl.
*G01L 1/25* (2006.01)
*G01N 29/12* (2006.01)
(Continued)

(52) U.S. Cl.
CPC .............. *G01L 1/255* (2013.01); *G01N 29/12* (2013.01); *G01N 29/24* (2013.01); *G01N 29/46* (2013.01);
(Continued)

(58) Field of Classification Search
CPC ........ G01L 1/255; G01N 29/24; G01N 29/12; G01N 29/46; G01N 29/04; G01N 29/14; G01N 29/2412
See application file for complete search history.

(56) References Cited

U.S. PATENT DOCUMENTS 5,164,669 A * 11/1992 Namkung ............... G01L 1/255
324/209
5,852,793 A * 12/1998 Board .................... G01H 1/003
702/56

(Continued)

FOREIGN PATENT DOCUMENTS

| CN | 105203638 A | 12/2015 |
| CN | 107315048 A | 11/2017 |
| CN | 108169330 A | 6/2018 |

OTHER PUBLICATIONS

English Translation of CN107315048.*

*Primary Examiner* — Helen C Kwok

(57) ABSTRACT

Disclosed is a method for determining internal uniaxial stress of steel members based on transverse wave phase spectrum, including: manufacturing a replicated steel member of an in-service steel structure member, where the replicated steel member and the in-service steel structure member are the same in material and thickness; loading a test on the replicated steel member to obtain two stress-spectral parameters; performing ultrasonic determination on the in-service steel structure member using an ultrasonic determination device; and collecting transverse wave signals using a signal acquisition system; processing the collected transverse wave signals through an information processing device to obtain a derived curve of the phase spectrum; capturing a first response frequency of the phase spectrum from the phase spectrum derived curve; and obtaining a (Continued)

uniaxial stress of the in-service steel structure member according to the stress-spectral parameters.

7 Claims, 9 Drawing Sheets

(51) Int. Cl.
    *G01N 29/24*     (2006.01)
    *G01N 29/46*     (2006.01)

(52) U.S. Cl.
    CPC ............... *G01N 2291/0234* (2013.01); *G01N 2291/044* (2013.01); *G01N 2291/101* (2013.01)

(56) References Cited

U.S. PATENT DOCUMENTS

| | | | |
|---|---|---|---|
| 2004/0176911 A1* | 9/2004 | Bratton | G01V 1/50 702/6 |
| 2008/0148593 A1* | 6/2008 | Tiitta | G01N 27/026 34/246 |
| 2013/0082191 A1* | 4/2013 | Raghavan | C09K 11/02 250/459.1 |
| 2019/0265178 A1* | 8/2019 | Martin | G01N 29/12 |
| 2020/0217730 A1* | 7/2020 | Li | G01L 1/255 |

* cited by examiner

METHOD FOR DETERMINATION OF INTERNAL UNIAXIAL STRESS OF STEEL MEMBER BASED ON PHASE SPECTRUM OF ULTRASONIC TRANSVERSE WAVE

CROSS-REFERENCE TO RELATED APPLICATIONS

This application claims the benefit of priority from Chinese Patent Application No. 201811615656.9, filed on Dec. 27, 2018. The contents of the aforementioned application, including any intervening amendments thereto, are incorporated herein by reference in its entirety.

TECHNICAL FIELD

The disclosure relates to nondestructive determination of stress of steel structure members, and particularly to a method for the determination of internal uniaxial stress of a steel member based on phase spectrum of ultrasonic transverse wave.

BACKGROUND OF THE INVENTION

Due to the characteristics of small weight, high strength and excellent deformability, the steel structures have been currently popularized in engineering practice. However, due to the design limitations and the environmental physical and chemical effect, problems such as stress concentration will be inevitably caused inside the steel structure. If reinforcement and maintenance measures cannot be applied in time to solve these problems, an overall collapse of the structure may even occur over time. Similar accidents continuously happen around the world. Moreover, a considerable number of manpower and financial resources have been invested for the construction of large steel structure buildings, such as Bird' Nest, Water Cube and other public landmark buildings, so that huge economic losses will be caused when the key stress member is destroyed by the excessive stress. Therefore, it is of significant importance for the steel structure buildings to timely obtain stress data of the steel member and analyze safety performance of the structure to take corresponding reinforcing and maintaining measures when the problems occur.

The traditional methods for the stress determination include a drilling method, a ring core method and a layer-removal strain method. In these methods, the member must be first damaged to release the stress, moreover, the involved devices are complex and the determination precision is poor. Compared to the traditional methods, the ultrasonic stress determination method can determine the internal stress of a steel member with a high precision. In addition, the equipments used in this method are convenient to operate and carry. Therefore, the ultrasonic stress determination technology has become one of the most commonly-used technical means in the stress determination of steel members.

Currently, the ultrasonic stress determination technology is mainly applied based on the development of an acoustic elastic technology, in which an acoustic elastic equation is established according to the relationship between the stress and the acoustic velocity or the acoustic time, so that the non-destructive determination of the stress is realized by measuring the acoustic velocity or the acoustic time.

On the basis of the above, those skilled in the art propose the use of critically refracted longitudinal wave, surface wave and the like to determine the mean absolute stress of the steel member. However, there are still some limitations in the ultrasonic stress determination method based on the acousto elastic principle, for example, time domain signals are difficult to extract; a known zero stress state is needed; and there are larger difficulties in the determination and more human errors. Therefore, it is required to develop a new method to determine the stress of the steel structure.

SUMMARY OF THE INVENTION

The disclosure provides a method for determining internal uniaxial stress of a steel member based on the phase spectrum of ultrasonic transverse wave to overcome the defects in the prior art, where the nondestructive determination for the absolute stress inside the in-service steel structure can be completed without damaging the steel member. Moreover, this method also involves simple operation and high determination precision.

In a first aspect, the disclosure provides a method for determining internal uniaxial stress of a steel member based on the phase spectrum of ultrasonic transverse wave, comprising:

(1) manufacturing a replicated steel member of an in-service steel structure member; wherein the replicated steel member and the in-service steel structure member are the same in material and thickness;

(2) loading a test on the replicated steel member to obtain two stress-spectral parameters;

(3) performing ultrasonic determination on the in-service steel structure member using an ultrasonic determination device; collecting transverse wave signals using a signal acquisition system; and (4) processing the collected transverse wave signals through an information processing system; and obtaining a uniaxial stress of the in-service steel structure member according to the two stress-spectral parameters.

In an embodiment, the step (4) comprises:

(4-1) processing the transverse wave signals to obtain a derived curve of the phase spectrum;

(4-2) capturing a frequency corresponding to a first maximum value point in the derived curve of the phase spectrum; and taking the captured frequency as a first response frequency of the phase spectrum; and (4-3) obtaining the uniaxial stress of the in-service steel structure member according to the two stress-spectral parameters and the first response frequency of the phase spectrum.

In an embodiment, the step (4-3) comprises:
obtaining the uniaxial stress σ of the in-service steel structure member according to Formula 1;
wherein the Formula 1 is shown as follows:

$$\sigma = \frac{k}{f_{max}} - c;$$

wherein, k and C are the two stress-spectrum parameters, k, MPa·MHz; and c, MPa;
$f_{max}$ is a value of the first response frequency of the phase spectrum, MHz; and σ, MPa.

In an embodiment, the step (4-1) comprises:
collecting time domain signals of the transverse wave signals, performing Fourier transform on the time domain signals to obtain an echo phase spectrum; and performing signal processing on the echo phase spectrum to obtain the derived curve of the phase spectrum.

In an embodiment, in the step (3), the ultrasonic wave determination device comprises an ultrasonic pulse emitter and receiver and an ultrasonic transverse wave probe; wherein the ultrasonic transverse wave probe is connected with the ultrasonic pulse emitter and receiver;

the ultrasonic transverse wave probe is capable of emitting and receiving a transverse wave;

an included angle formed between a direction of the transverse wave emitted from the ultrasonic transverse wave probe and a uniaxial direction of the in-service steel structure member is close to $\pi/4$, but not equal to $\pi/4$.

In an embodiment, pulse signals emitted from the ultrasonic pulse emitter and receiver are processed by the ultrasonic transverse wave probe to generate the transverse wave signals; the transverse wave signals are transmitted in the in-service steel structure member and reflected to be received by the ultrasonic transverse wave probe;

the ultrasonic pulse emitter and receiver is further connected with an oscilloscope; and the ultrasonic pulse emitter and receiver converts the ultrasonic wave signals received by the ultrasonic transverse wave probe into echo signals which are then displayed on the oscilloscope.

In an embodiment, the probe has a center frequency of 5 MHz and a bandwidth of 0-10 MHz; and a sampling rate of the oscilloscope is greater than 1 GSa/s.

In an embodiment, the in-service steel structure member has opposite end faces;

the uniaxial stress of the in-service steel structure member is an absolute stress of the in-service steel structure member in a real-time state.

The disclosure has the following beneficial effects.

1) The method provided herein can ensure the nondestructive determination for the internal axial stress of a steel structure member under construction or a constructed steel structure member.

2) The traditional stress determination methods can only determine the stress variation and the surface stress of the steel member, and it is difficult to capture the time domain signals in the acoustic time method due to the complicated operation. The method provided by the disclosure can overcome the defects in the above-mentioned methods, enabling the nondestructive determination for the absolute stress inside the in-service steel member. In addition, this method also involves the precise capturing for the frequency domain signals, high precision and simple operation.

3) In the frequency domain of the method, each point represents the information of a harmonic component, leading to small influence from the coupling state and significant difference among the echo signals in the frequency domain. In the application of the spectrum analysis, the data point corresponding to the zero-stress state is not special, and the information of the frequency spectrum can be fully utilized in the use of the spectral characteristic quantity as a processing parameter, allowing for a higher reliability.

4) This method has a relatively low requirement for the sampling rate of the oscilloscope, and also shows a certain resistance to the high-frequency noise in the environment.

5) In the method provided herein, significant difference caused by the stress is observed in the frequency domain signals, so that the characteristic values of the phase spectrum can be more accurately captured, ensuring a reliable stress determination result and simultaneously judging the tension and compression state of the stress. The method is suitable not only for the nondestructive determination of the internal stress of a constructed steel structure member or a steel structure member under construction, but also for the nondestructive determination of the internal stress of a steel structure member after suffering from natural disasters.

In conclusion, the method provided by the disclosure can improve the precision of the stress determination, facilitating the further application of the ultrasonic nondestructive determination in the nondestructive determination of stress.

DETAILED DESCRIPTION OF EMBODIMENTS

In order to better explain the disclosure for better understanding, the disclosure will be described in detail below with reference to the accompanying drawings and embodiments.

In view of the defects in the prior art, the disclosure provides a method for determining internal uniaxial stress of a steel member based on the phase spectrum of ultrasonic transverse wave. Compared to the prior art, the method disclosed herein can enable the determination of the uniaxial stress of the steel member by analyzing the derived curve of the phase spectrum.

In an embodiment of the disclosure, the stress-spectrum parameters are calibrated by loading test on the replicated steel member, through which the first response frequency of the phase spectrum of the in-service steel member under uniaxial stress is measured. The uniaxial stress of the steel structure member is obtained according to the linear relationship between the reciprocal of the first response frequency of the phase spectrum of the ultrasonic transverse wave echo and the stress.

Figure 1:
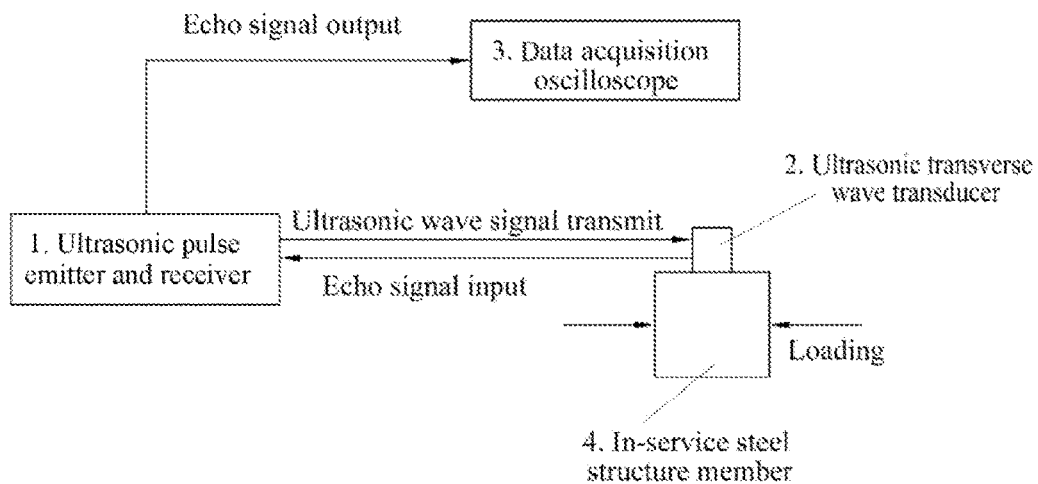
FIG. 1 schematically shows a hardware system used in the determination method of the disclosure.

The hardware system integration for the determination of the internal uniaxial stress of a steel member based on the phase spectrum of the ultrasonic transverse wave is shown in FIG. 1, which includes an ultrasonic pulse emitter and receiver 1, an ultrasonic transverse wave transducer 2 capable of transmitting and receiving a transverse wave (namely an ultrasonic transverse wave probe) and a data-acquisition oscilloscope 3. The ultrasonic pulse emitter and receiver 1 is respectively connected with the ultrasonic transverse wave transducer 2 and the data-acquisition oscilloscope 3.

Since the method is based on the birefringence effect of the transverse wave and the spectrum analysis technique, where the birefringence effect is a specific property of the transverse wave and the spectrum analysis technique requires that the collected signals have a certain resolution and bandwidth, the ultrasonic transverse wave transducer in the embodiment has a center frequency of 5 MHz and a frequency band of 0-10 MHz.

The data-acquisition oscilloscope 3 is configured to receive a transverse wave echo signal, and there is no special requirement in the method for the sampling rate of the data-acquisition oscilloscope 3. Since the noise signals are generally high-frequency components, a desirable result can be obtained at the sampling rate of 1 GAS/s. In addition, this embodiment mainly investigates the change of low-frequency signals (0-10 MHz) of correlation curves of the phase spectrum, so the high-frequency components have little effect on the determination result.

Figure 2:
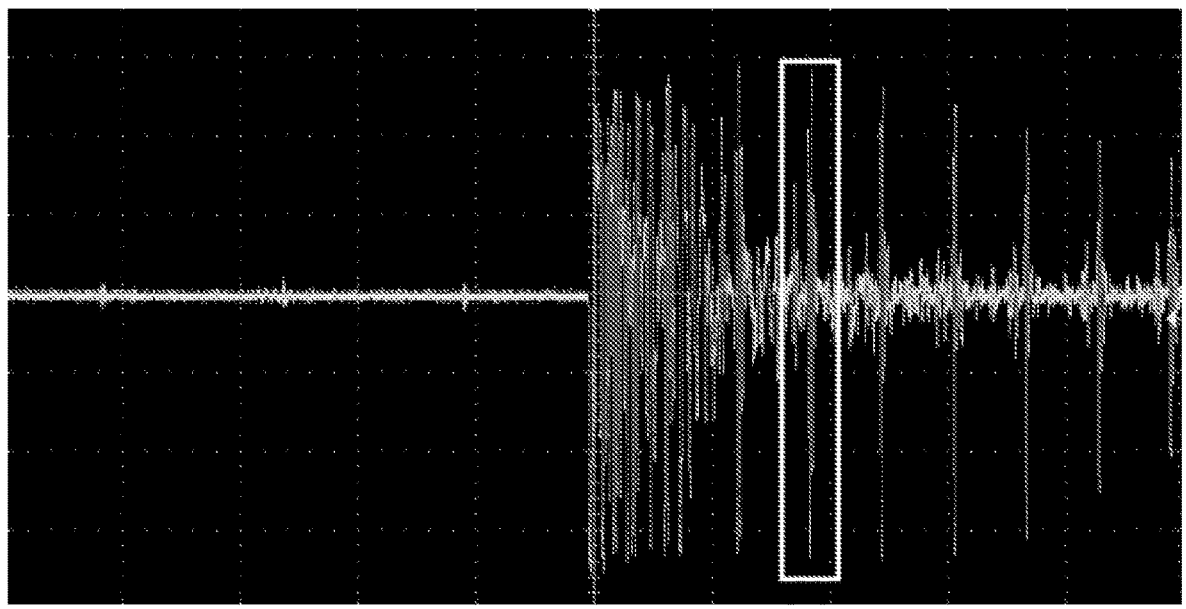
FIG. 2 schematically shows an ultrasonic transverse wave displayed on an oscilloscope according to the disclosure.
Figure 3:
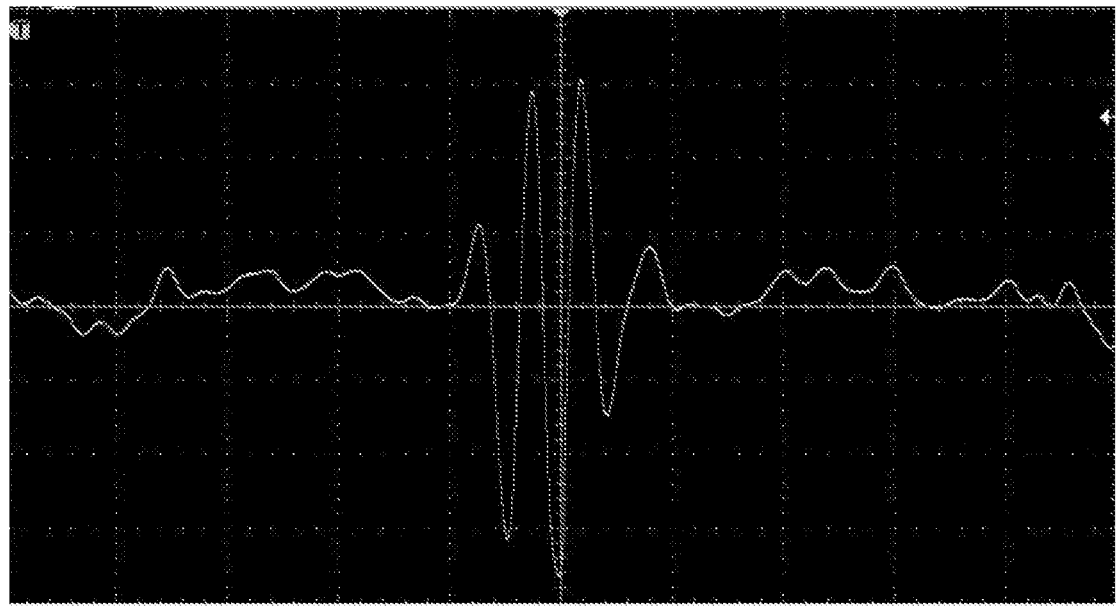
FIG. 3 schematically shows the first echo signal of the ultrasonic transverse wave (i.e., the target wave band to be processed) according to the disclosure.
Figure 4:
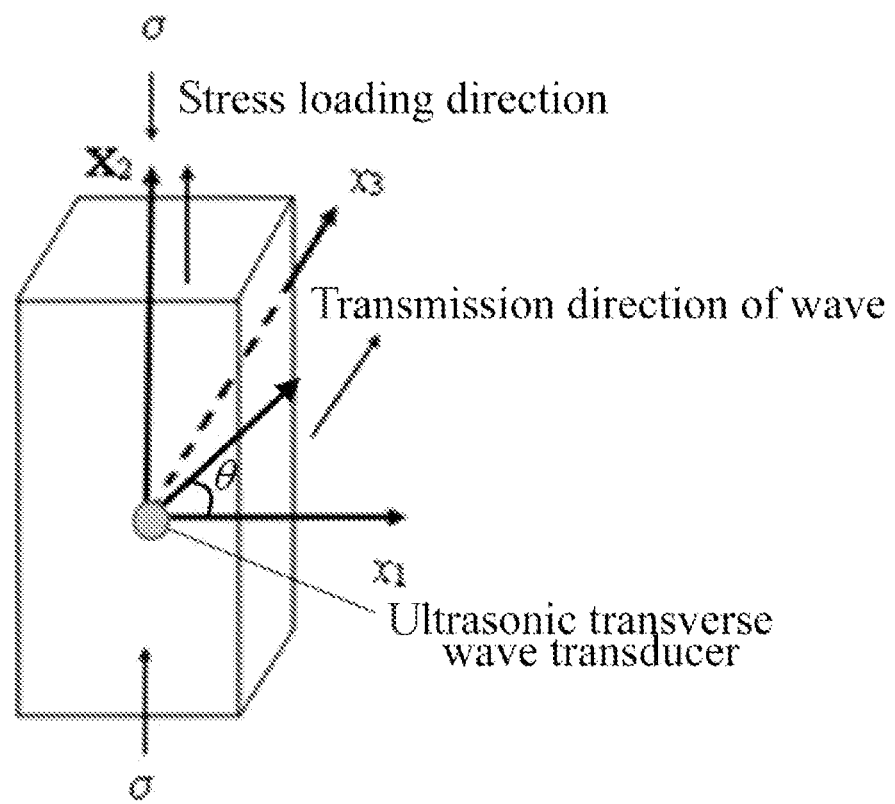
FIG. 4 schematically shows the transmission of ultrasonic transverse waves in a steel member according to the disclosure.

The principle of determining the uniaxial stress of the steel member using the integrated hardware system based on the phase spectrum is described as follows. The instruments are connected as shown in FIG. 1, where the ultrasonic pulse emitter and receiver 1 emits pulse signals, which are processed by the ultrasonic transverse wave transducer 2 to generate transverse wave signals. The transverse wave signals are propagated in the in-service steel structure member 4 and reflected to be received by the ultrasonic transverse wave transducer 2. Echo signals are input into the ultrasonic pulse emitter and receiver 1 and finally displayed on the data-acquisition oscilloscope 3. Multiple echo signals are displayed on the data-acquisition oscilloscope 3 as shown in FIG. 2. In the embodiment, the echo signal of the in-service steel member after the first reflection is intercepted and analyzed, which is shown in FIG. 3. The time domain signal of the first echo is processed through a software system on a PC (namely an information processing software) to analyze the change rules of the function curve of the phase spectrum thereof to obtain a derived curve of the phase spectrum and capture a first response frequency of the phase spectrum.

The angle between the incident direction of the transverse wave transmitted by the ultrasonic transverse wave probe which is capable of transmitting and receiving transverse wave and the axial direction of the in-service steel member is close to $\pi/4$, but does not include $\pi/4$, ensuring that nonlinear information generated due to the action of stress is contained in the received signals.

The first response frequency of the phase spectrum is obtained by the following method. Through the transmission and receiving of the ultrasonic transverse wave, a clear transverse wave signal is displayed on the data-acquisition oscilloscope 3, and then the time domain signal of the transverse wave is collected. After obtaining an echo phase spectrum through the time-frequency domain conversion module in the software system, the data is further processed to obtain a derived curve of the phase spectrum, where a frequency corresponding to the first maximum value in the derived curve of the phase spectrum is captured as the first response frequency of the phase spectrum.

Figure 6:
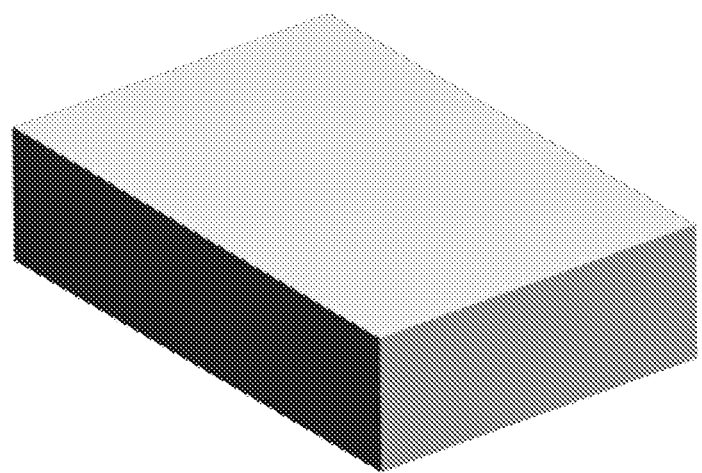
FIG. 6 shows a member of the disclosure used for primary test, where the dimensions are 44.95 mm×29.71 mm×16.00 mm and the material is 65# steel.

The stress-spectrum parameters are obtained by the following steps: replicating the in-service steel member; stepwise applying stress on the replicated steel member, where each stress state is kept for 5 min; collecting the signal data and recording the corresponding stress to obtain the reciprocal of the first response frequency of the phase spectrum and the stress by the software system; and calibrating the stress-spectrum parameters by fitting the data using a least square method. In such process, the material and thickness of the replicated steel member (as shown in FIG. 6) are required to be the same as those of the in-service steel member to ensure the accuracy and validity of the calibration result.

The uniaxial stress refers to an absolute stress of the in-service steel member in the real-time state, but not the change of the stress occurring in a certain period. The comparison between the absolute stress and the safe stress range can be used to estimate the current safety of the steel member.

The method of the embodiment includes the following steps:

(1) replicating an in-service steel member to prepare a replica of the in-service steel member, i.e., a replicated steel member;

where the material and the thickness of the replica are the same as those of the in-service steel structure member;

(2) loading a test on the replicated steel member to calibrate the two stress-spectrum parameters;

(3) performing ultrasonic determination on the in-service steel member using an ultrasonic determination devices; collecting the transverse wave signals using a signal acquisition system; and then processing the collected transverse wave signals using the information processing software to obtain a derived curve of the phase spectrum; and (4) capturing a first response frequency of the phase spectrum from the derived curve of the phase spectrum; and obtaining the uniaxial stress of the in-service steel structure member according to the stress-spectrum parameters.

Specifically, the received ultrasonic transverse wave signal can be processed to obtain the corresponding derived curve of the phase spectrum, and the first response frequency of the phase spectrum is captured and the uniaxial stress of the in-service steel member is solved on the basis of the derived curve of the phase spectrum.

The absolute stress of the in-service steel member is calculated as follows:

$$\sigma = \frac{k}{f_{max}} - c;$$

where σ is the absolute stress to be solved of the in-service steel member, MPa;

$f_{max}$ is the first response frequency value of the phase spectrum of the ultrasonic transverse wave, namely a frequency value corresponding to the first maximum value in the derived curve of the phase spectrum of the transverse wave echo, MHz;

k and C are the required stress-spectrum parameters, which characterize the properties of the material, where the unit of k is MPa·MHz and the unit of C is MPa.

The in-service steel member includes a common building steel member and other members made of other metal materials for other applications.

The absolute stress includes the stress caused by the environmental loading effect and self weight during the service period of the steel member and the welding residual stress and the loading stress of other metal members.

Embodiment 1 Description of the Determination Method of the Disclosure and Relevant Principles Thereof The principle of the nondestructive determination method for internal uniaxial stress of a steel structure member based on the phase spectrum of the ultrasonic transverse wave echo is explained as follows.

When stress exists in the steel member to be determined, the stress causes the acoustical anisotropy of the material. At this moment, an ultrasonic transverse wave is emitted from the probe to enter the steel member, and then the incident transverse wave is decomposed into two wave components. The two wave components propagate at different speeds, and their polarization directions are perpendicular to each other, which is known as the birefringence phenomenon and is unique to the ultrasonic transverse waves.

Through a combination of the transverse wave birefringence effect, the spectrum analysis technique and the existing wave equation theory, an ultrasonic echo vibration equation is obtained from the fact that the two transverse wave components generated by the birefringence effect of the transverse wave are reflected on the bottom surface of the steel member and then are propagated to the probe, and is shown as follows:

$$u_r(t) = y\left(t - \frac{2l}{v_{31}}\right)\cos^2\theta + y\left(t - \frac{2l}{v_{32}}\right)\sin^2\theta. \tag{1}$$

For convenience of the description, the disclosure adopts:

$$a = \frac{2l}{v_{31}} \tag{2}$$

$$b = \frac{2l}{v_{32}} \tag{3}$$

$$P = \frac{2l}{v_{32}} - \frac{2l}{v_{31}} \tag{4}$$

and $$Q = \frac{2l}{v_{31}} + \frac{2l}{v_{32}}. \tag{5}$$

The equations (2) and (3) are substituted into equation (1) to obtain equation (6):

$$u_r(t) = y(t-a)\cos^2\theta + y(t-b)\sin^2\theta \tag{6}$$

The time domain relationship between the parameters is converted into frequency domain to obtain equation (7):

$$u_r(f) = u_0(f)\cos^2\theta e^{-i2\pi f a} + u_0(f)\sin^2\theta e^{-i2\pi f b} \tag{7}$$

where $u_r(f)$ and $u_0(f)$ are the Fourier transforms respectively of $u_r(t)$ and $y(t)$.

Further, the phase corresponding to each frequency is obtained as follows:

$$\varphi_r(f) = \varphi_0(f) - \pi f Q + \arctan(\tan(\pi f P)\cos(2\theta)) \tag{8}$$

where $\varphi_r(f)$ and $\varphi_0(f)$ are the phases respectively corresponding to $u_r(f)$ and $u_0(f)$.

Through the equation (8) which is used to calculate the phase corresponding to each frequency, a phase value of the bottom surface echo received by the surface ($x_3=0$) of the steel member at an incident angle of 45 degrees can be obtained as follows:

$$\varphi_{45°}(f) = \varphi_0(f) - \pi f Q \tag{9}$$

Through the equations (8) and (9), a phase difference function is obtained as follows:

$$\Delta\varphi = \varphi_r(f) - \varphi_{45°}(f) = \arctan(\tan(\pi f P)\cdot\cos 2\theta) \tag{10}$$

It can be seen from the phase difference function that the phase value of the echo spectrum adjustment function may represent the magnitude of the phase shift of the echo spectrum.

It can be obtained through further analysis that the derivative function value of the phase difference is positively correlated with the acoustic time difference P of the transverse wave components. When the acoustic time difference of the transverse wave components is increased, the derivative function value of the phase difference is also increased. Given the theory of acoustic elasticity, the propagation velocities of the transverse wave components are affected by the stress of the steel member, so that the acoustic time difference of the transverse wave components is closely associated with the stress. By analyzing the derived curve of the phase difference of the transverse wave echo, a theoretical formula for the determination of the uniaxial stress of the steel member is obtained. In the actual application, when the ultrasonic probe is fixed on the steel member, the acoustic time difference P of the transverse wave components is accordingly determined. In the theoretical analysis, the absolute value curve of the derivative function of the phase difference is obtained as shown in FIG. 5 in the case of P of 100 ns.

Figure 5:
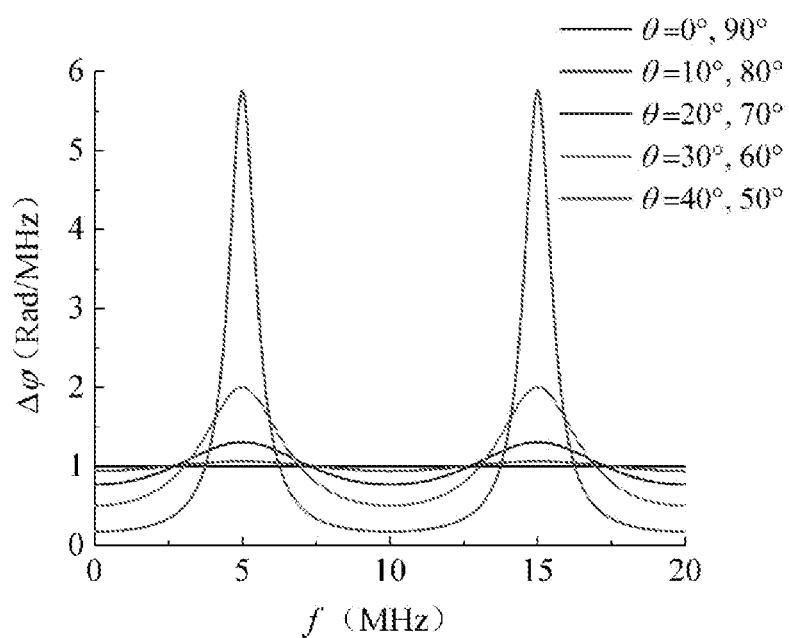
FIG. 5 shows the derived curve of the phase difference of an ultrasonic transverse wave echo at different incident angles according to the disclosure.

It can be seen from FIG. 5 that when the incident angle of the transverse wave is given, the maximum value will periodically appear in the derivative function of the phase difference. In the disclosure, the frequency corresponding to the maximum value is referred to the response frequency, and the relationship between the response frequency and the acoustic time difference of the transverse wave components is shown as follows:

$$f_{max} = \frac{2N-1}{2P}, (N = 1, 2, 3, \dots ).  \quad (11)$$

In the elasticity range, based on the acousto elastic theory, an acousto elastic formula for the stress determination of the ultrasonic transverse wave has been provided by researchers, and is shown as follows:

$$B = B_0 + m \cdot \sigma \quad (12),$$

where B is a birefringence coefficient of the transverse wave, which characterizes the relative velocity of the transverse wave components, and can be used to express the acoustical anisotropy as follows:

$$B = \frac{v_{31} - v_{32}}{(v_{31} + v_{32})/2}. \quad (13)$$

When the member is in an unstressed state, the acoustical anisotropy of the material itself will be caused by the factors such as texture, and the obtained birefringence coefficient of the transverse wave is $B_0$. m is formed by a second-order elastic coefficient and a third-order elastic coefficient, which represents the characteristic of the material.

It is assumed that the material is elastic in the deformation process and the steel has a large elastic modulus, so that when the steel is stressed in the elastic range, the dimensional change in the direction of propagation of the ultrasonic wave is very small, therefore, the thickness l can be considered approximately unchanged. Given the above, equation (14) is obtained as follows:

$$\frac{l}{v_0} = t_0, \quad (14)$$

where $t_0$ is the one-way propagation time of a transverse wave in a steel member under the unstressed state, $v_0$ characterizes the propagation velocity of the transverse wave in the steel member under the unstressed state.

The wave velocity of the transverse wave is less affected by the stress, specifically, only a change of about 0.1% occurs to the wave velocity when the steel member suffers from a stress of 100 MPa. Therefore, the following approximate formula is obtained:

$$v_{32} \approx v_{31} \approx v_0 \quad (15).$$

Based on the formulas (4) and (13) respectively of the acoustic time difference P of the transverse wave components and a birefringence coefficient B of the transverse wave and formulas (14) and (15), a relationship between the acoustic time difference P of the transverse wave components and the birefringence coefficient B of the transverse wave is established as follows:

$$P = 2Bt_0 \quad (16).$$

The formulas (16) and (11) are substituted into the formula (12), and after the necessary mathematical process, a determination formula of the uniaxial stress is established as follows:

$$\sigma = \frac{(2N-1)k}{f_{max}} - c, \quad (17)$$

where, σ is the stress in the member, k and C are related to the thickness of the member, the elastic coefficient of the material and the anisotropy of the material itself, and are expressed as follows:

$$k = \frac{1}{4mt_0} = \frac{1}{4t_0} \cdot \frac{8\mu^2}{4\mu + n} \quad (18)$$

$$c = \frac{B_0}{m} = \frac{8\mu^2}{4\mu + n} \cdot B_0 \quad (19)$$

where, μ is a second-order elastic constant, and n is a three-order elastic constant.

The formula (17) is adopted in the determination of uniaxial stress on a steel member based on the phase spectrum, where a period parameter N exists and needs to be determined. An ultrasonic transverse wave probe which is capable of transmitting and receiving transverse wave is fixed on a test specimen for the loading test, where the test specimen, as shown in FIG. 6, has dimensions of 44.95 mm×29.71 mm×16.00 mm, and is made of 65# steel. When the external stress is 400 MPa, the phase spectrum of the ultrasonic echo received by the probe is shown in FIG. 7.

Figure 7:
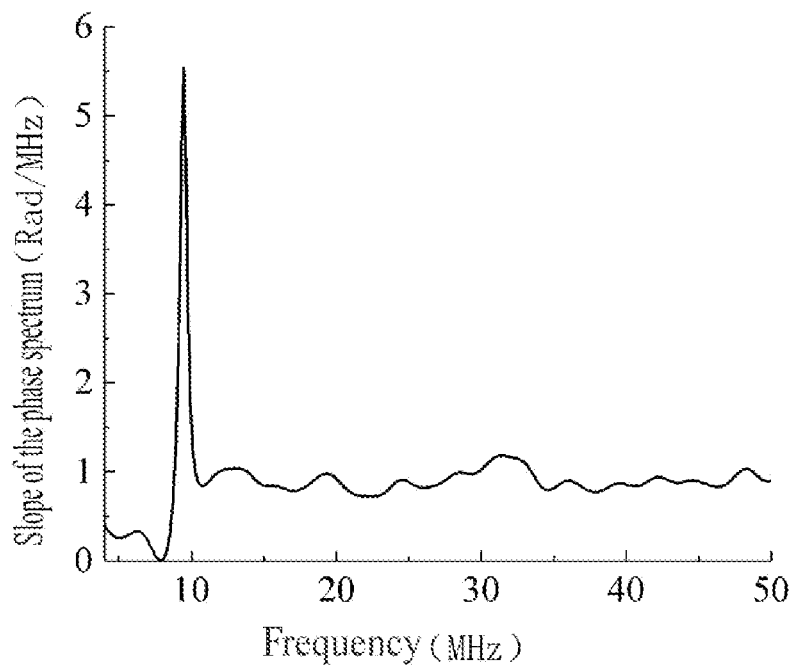
FIG. 7 shows a derived curve of the phase difference of an echo signal of the ultrasonic transverse wave of the member used for the primary test when the applied stress is 400 MPa.

The extreme point of the derivative function of the phase difference is obvious in the frequency band range of 0 to 10 MHz in FIG. 7. Since the frequency corresponding to the first maximum value of the derivative function of the phase difference of the transverse wave needs to be extracted to achieve the determination of the stress, the target frequency band for the research is located in a frequency band of 0 to 10 MHz to facilitate the data reading and analysis.

Therefore, in the case that N is 1, the theoretical formula for the determination of the uniaxial stress on the steel member based on the phase spectrum is obtained as follows:

$$\sigma = \frac{k}{f_{max}} - c, \quad (20)$$

where $f_{max}$ is a first response frequency corresponding to the extreme value of the derivative function of the phase difference of an ultrasonic echo. It can be seen from the formula (20) that the stress in the steel member is linearly correlated with the reciprocal of the first response frequency.

On the basis of performing linear fitting to obtain the stress-spectrum parameters, the first response frequency value of the ultrasonic transverse wave signal propagating in the stressed steel member is measured and substituted into the formula (20), obtaining the uniaxial stress value of the steel member.

Figure 9:
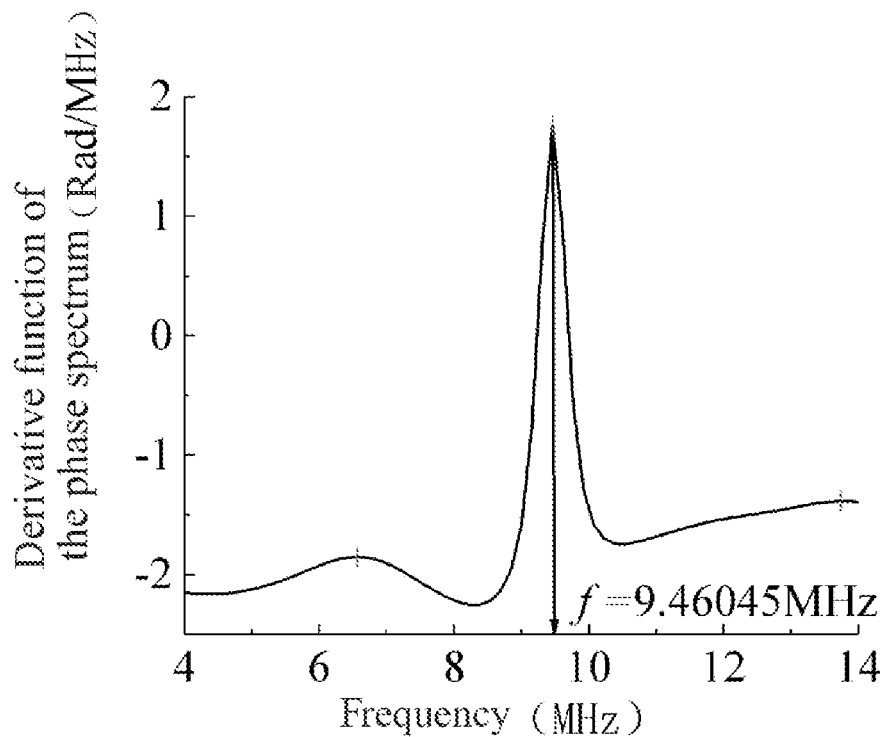
FIG. 9 shows a derived curve of the phase spectrum when the primary test member is loaded with a stress of 400 MPa according to the disclosure.
Figure 10:
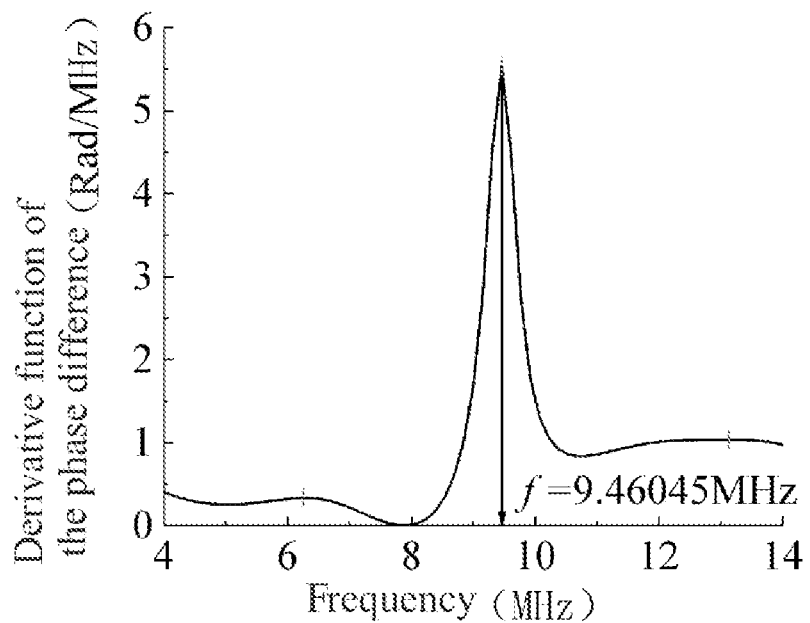
FIG. 10 shows a derived curve of the phase difference when the primary test member is loaded with a stress of 400 MPa according to the disclosure.

The test specimen in FIG. 6 is further studied as follows. The incident direction of the transverse wave of the probe is adjusted to 45 degrees. After being loaded, the resulting unwrapped phase spectrum curve is approximately a straight line with a constant slope. It can be seen from the formulas (8), (9) and (10) that under the action of the axial stress, the derivative function of the phase spectrum differs from that of the phase difference only by a constant, that is, the derived curve of the phase spectrum is obtained through translating the derived curve of the phase difference in the Y-axis direction, so that the frequencies corresponding to the points of the extreme values of the two derived curves should be consistent. The resulting derived curves of the phase spectrum and the phase difference obtained by loading 400 MPa to a primary test member are respectively shown in FIGS. 9 and 10. It is found that the derived curve of the phase spectrum is substantially similar to the derived curve of the phase difference in the shape, and only the vertical coordinates are different. The frequencies corresponding to the points of the extreme values respectively in the two figures are the same, which is consistent with the theoretical analysis. Due to the factors such as experimental errors, the phase spectrum function obtained at an incident angle of 45 degrees only shows an approximate linearity. However, since the extreme value of the derivative function of the phase spectrum is relatively large, the approximate linearity has no significant influence on the capture of the frequency corresponding to the extreme value. Therefore, the response frequency of the phase difference derived curve in the theoretical formula for the uniaxial stress determination can be directly obtained through the frequency corresponding to the extreme value of the phase spectrum derivative function, greatly optimizing the whole. In order to simplify the operation process, the first response frequency is directly captured herein through the derived curve of the phase spectrum.

On the basis of the theoretical deduction mentioned above, the method can be implemented through four steps, including: (1) replicating the in-service steel member to produce an in-service steel member replica; (2) loading a test on the replicated steel member to calibrate the stress-spectrum parameters; (3) performing ultrasonic testing and signal processing to obtain the derived curve of the phase spectrum; and (4) capturing the first response frequency of the phase spectrum from the derived curve of the phase spectrum to solve the uniaxial stress of the in-service steel member. The specific implementation process is described as follows.

The replication of the in-service steel member in step (1) is specifically performed as follows. In nondestructive determination of the in-service steel member, a loading test cannot be carried out on the original steel member to calibrate the stress-spectrum parameters. Therefore, the method provided herein selects a member with the same thickness and material as the in-service steel member, i.e., the replicated steel member, on which the parameter calibration is carried out.

Figure 8:
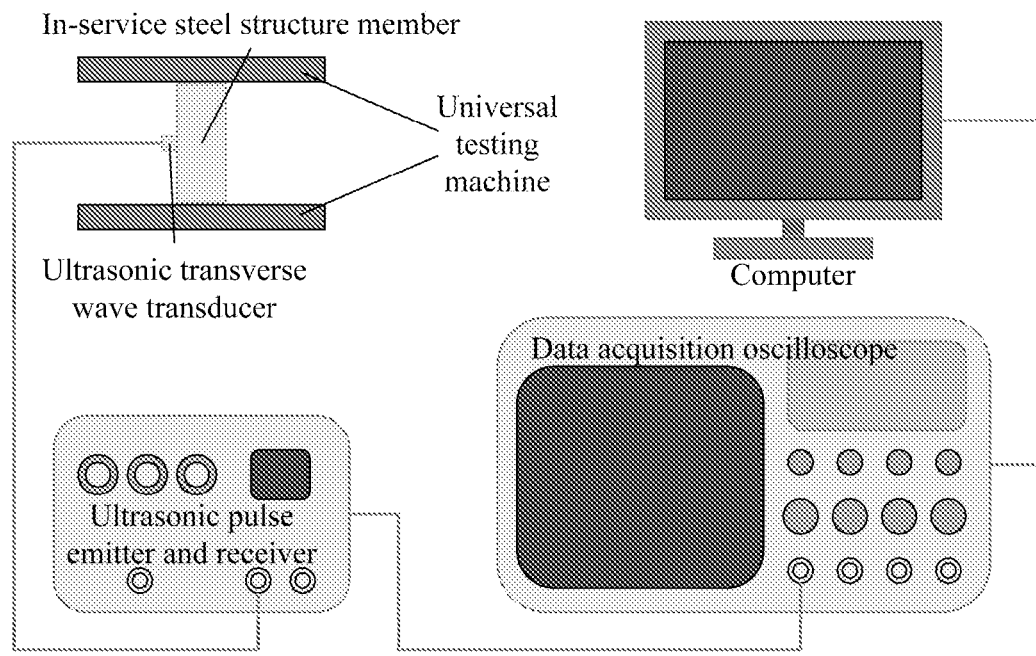
FIG. 8 schematically shows a system for stress loading and stress determination of a steel member according to the disclosure.

In step (2), the parameters of the replicated member are fitted as follows. The instruments are arranged and connected as shown in FIG. 1, and then the stress determination system is adjusted to ensure that the ultrasonic signals on the oscilloscope are clear and effective. The ultrasonic probe is fixed on the surface of the test specimen. Theoretical analysis shows that when the incident angle of the ultrasonic wave is controlled to be near 45 degrees, the characteristic value in the frequency domain signal is obvious. In the embodiment, the incident angle of the ultrasonic transverse wave is kept at 30 degrees. According to the stress loading and determination system shown in FIG. 8, a set of axial forces are applied to the steel member. A short interval random loading is adopted to ensure the randomness of the test data, where each stress state is kept for 5 min. The echo signals of the ultrasonic transverse wave and the corresponding stress are recorded. Fourier transform, through which the time domain signals can be converted into frequency domain signals, is carried out on the ultrasonic signals, and derived curves of the phase spectrums are obtained. The first response frequency for each stress is extracted from the corresponding curve, and the reciprocals of the first response frequencies can be calculated to obtain the corresponding stress. The reciprocal of the first response frequency of the phase spectrum and the corresponding stress are fitted by least square method to obtain the stress-spectrum parameters k and c in the formula (20).

In step (3), through the transmission and receiving of the ultrasonic transverse wave, a clear transverse wave signal is displayed on the signal acquisition device. Then a time domain signal is collected and processed through a frequency domain conversion module in the software system to obtain the echo phase spectrum. The software system of the disclosure is adopted for further data processing to obtain a derived curve of the phase spectrum.

In step (4), the first response frequency of the phase spectrum is captured and the uniaxial stress of the in-service steel member is solved. The first response frequency of the phase spectrum corresponding to the first extreme value captured in the derived function curve of the phase spectrum obtained in step (3) is substituted into the formula (20) to obtain the uniaxial stress value of the in-service steel member.

Embodiment 2 Application of the Method for Determining Internal Uniaxial Stress on a Steel Member Based on Phase Spectrum of the Ultrasonic Transverse Wave Provided Herein in the Test of the Uniaxial Stress of the Steel Member In order to further verify the precision of the method for determining the uniaxial stress on the steel member provided by the disclosure, a test for determination of the uniaxial stress on the steel member and a comparison test are carried out hereinafter.

High-quality 65# structural steel can be used for load-bearing structures and connecting members, and is one of the most important structural steels in construction projects. Therefore, the high-quality 65# steel is taken as an object in the method for determining the uniaxial stress on the steel member, and the dimensions of the test members are shown in Table 1.

TABLE 1

Material and dimensions of test members

| Name | Material | Dimensions |
| --- | --- | --- |
| Steel Plate A | 65# steel | 55.0 mm × 30.0 mm × 18.0 mm |
| Steel Plate B | 65# steel | 50.0 mm × 30.0 mm × 19.0 mm |

The replication of the in-service steel member in step (1) is described as follows. In this test, the steel members are only loaded in the elastic range, so the steel plates can be repeatedly used. The stress measurement is carried out by directly using steel plate A and steel plate B as replicated members of in-service steel members.

Figure 11:
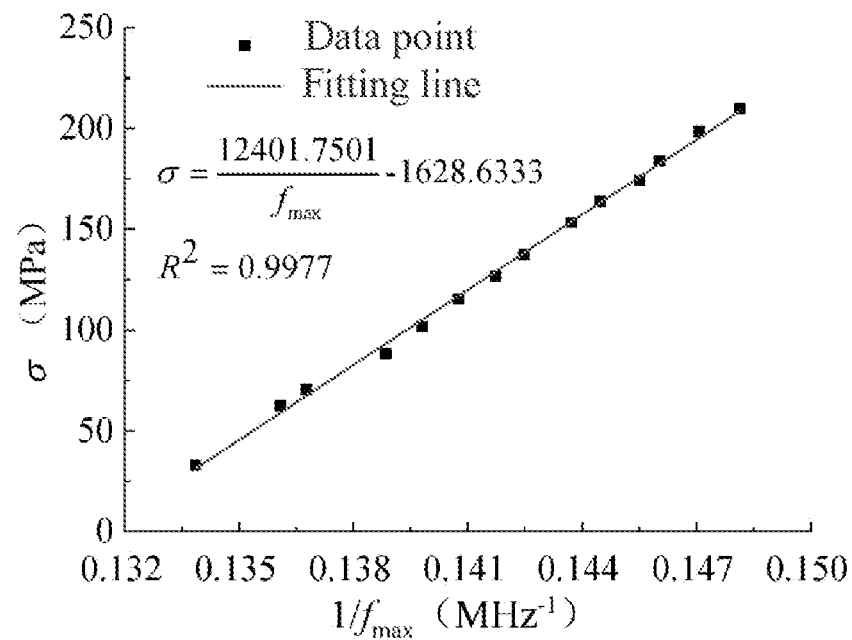
FIG. 11 schematically shows a fitting curve of the reciprocal of a first response frequency of the phase spectrum and the corresponding stress obtained by loading the stress on a steel plate A according to the disclosure.
Figure 12:
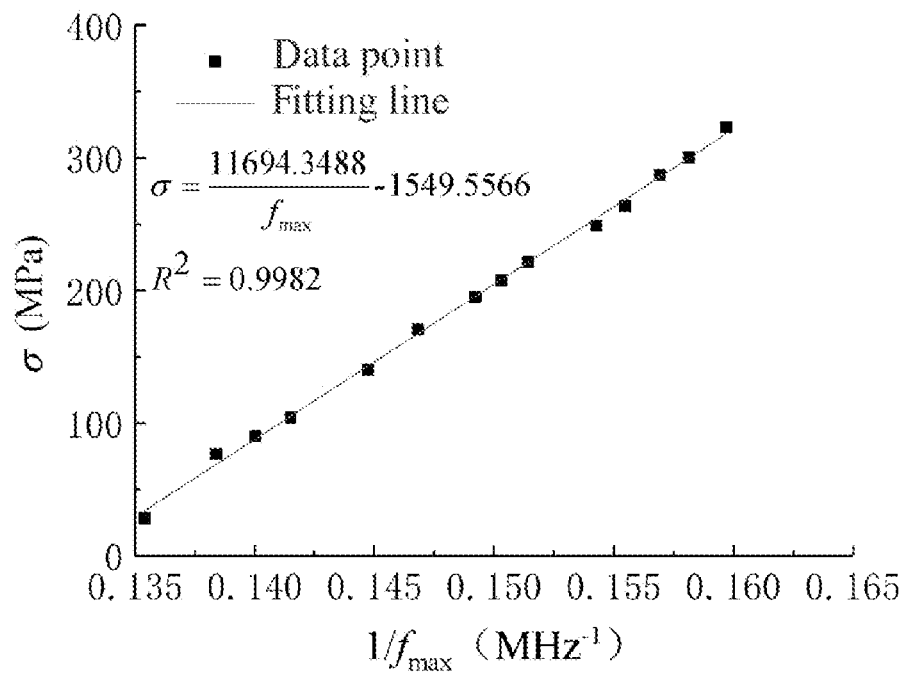
FIG. 12 schematically shows a fitting curve of the reciprocal of a first response frequency of the phase spectrum and the corresponding stress obtained by loading the stress on a steel plate B according to the disclosure.

In step (2), the stress-spectrum parameters are calibrated on the replicated members. The steel plates A and B are respectively subjected to short interval random loading using a universal testing machine, where each stress state is kept for 5 min, and the ultrasonic signals and the stress are recorded simultaneously. The signals are processed to obtain phase spectrum curves and the first response frequencies of the phase spectrums are captured and paired with the corresponding stress. The results are shown in Tables 2 and 3. It can be found that as the stress increases, a more apparent maximum value appears in the phase spectrum curve, and the point of the frequency corresponding to the maximum value, namely the first response frequency point, continuously moves leftwards, which is consistent with the theoretical formula. The reciprocals of the first response frequencies of the phase spectrums in Tables 2 and 3 are calculated and then linearly fitted with the stress values by least square method to obtain a fitting curve and a relational expression of the stress and the reciprocal of the first response frequency of the phase spectrum, which are respectively shown in FIG. 11 and FIG. 12. It can be seen from the figures that the determination coefficients of the two fitting straight lines are both close to 1, showing a good linear relationship.

In step (3), the propagation signals of the ultrasonic transverse waves in the in-service steel member are collected and processed. The universal testing machine is used to apply a set of random stress on the steel members A and B to simulate the stress state of the steel member in the service state. A stress determination system is used to obtain signals for blind determination to obtain the echo signal corresponding to each stress. Data processing is carried out on the signals through a software system provided by the disclosure to obtain a corresponding derived curve of the phase spectrum.

In step (4), the first response frequency of the phase spectrum is captures and the uniaxial stress on the in-service steel member is solved. The frequency corresponding to the first maximum value, namely the first response frequency of the phase spectrum, is captured from the derived curve of the phase spectrum obtained in the step (3) and substituted into the formula (20) to obtain the values of the stress applied on the steel plates A and B. The results are respectively listed in Tables 4 and 5.

TABLE 2

Stress values and first response frequencies of steel plate A under different loads

| $\sigma$ (MPa) | $f_{max}$ (MHz) | $\sigma$ (MPa) | $f_{max}$ (MHz) |
| --- | --- | --- | --- |
| 33.12554 | 7.470703 | 137.39039 | 7.019043 |
| 62.40066 | 7.348633 | 153.31171 | 6.958008 |
| 70.52264 | 7.312012 | 163.84070 | 6.921387 |
| 88.31661 | 7.202148 | 174.25418 | 6.872559 |
| 101.92260 | 7.153320 | 183.84734 | 6.848145 |
| 115.41308 | 7.104492 | 198.65866 | 6.799316 |
| 126.83757 | 7.055664 | 209.70282 | 6.750488 |

TABLE 3

Stress values and first response frequencies of steel plate B under different loads

| $\sigma$ (MPa) | $f_{max}$ (MHz) | $\sigma$ (MPa) | $f_{max}$ (MHz) |
| --- | --- | --- | --- |
| 28.3103 | 7.385524 | 207.449 | 6.652917 |
| 76.7322 | 7.226478 | 221.6539 | 6.604147 |
| 90.0879 | 7.141327 | 248.7879 | 6.482142 |
| 104.0244 | 7.067637 | 263.9571 | 6.432937 |
| 139.9841 | 6.909418 | 287.3385 | 6.372268 |
| 170.3753 | 6.811525 | 300.409 | 6.323111 |
| 194.9487 | 6.701515 | 323.0576 | 6.262133 |

TABLE 4

First response frequency values of steel plate A under different loads and stress values obtained by the method of the disclosure

| $f_{max}$ (MHz) | $\sigma$ (MPa) | $f_{max}$ (MHz) | $\sigma$ (MPa) |
| --- | --- | --- | --- |
| 7.507870 | 23.2 | 6.894713 | 170.1 |
| 7.373509 | 53.3 | 6.836561 | 185.4 |
| 7.256588 | 80.4 | 6.746926 | 209.5 |
| 7.204735 | 92.7 | 6.698459 | 222.8 |
| 7.050321 | 130.4 | 6.591300 | 252.9 |
| 7.005715 | 141.6 | 6.502482 | 278.6 |

TABLE 5

First response frequency values of steel plate B under different loads and stress values obtained by the method of the disclosure

| $f_{max}$ (MHz) | $\sigma$ (MPa) | $f_{max}$ (MHz) | $\sigma$ (MPa) |
| --- | --- | --- | --- |
| 7.430378 | 24.3 | 6.840174 | 160.1 |
| 7.316025 | 48.9 | 6.741204 | 185.2 |
| 7.219373 | 70.3 | 6.635631 | 212.8 |
| 7.087241 | 100.5 | 6.570019 | 230.4 |
| 6.994828 | 122.3 | 6.480096 | 255.1 |
| 6.939621 | 135.6 | 6.385272 | 281.9 |

Comparative Experiment

Figure 13:
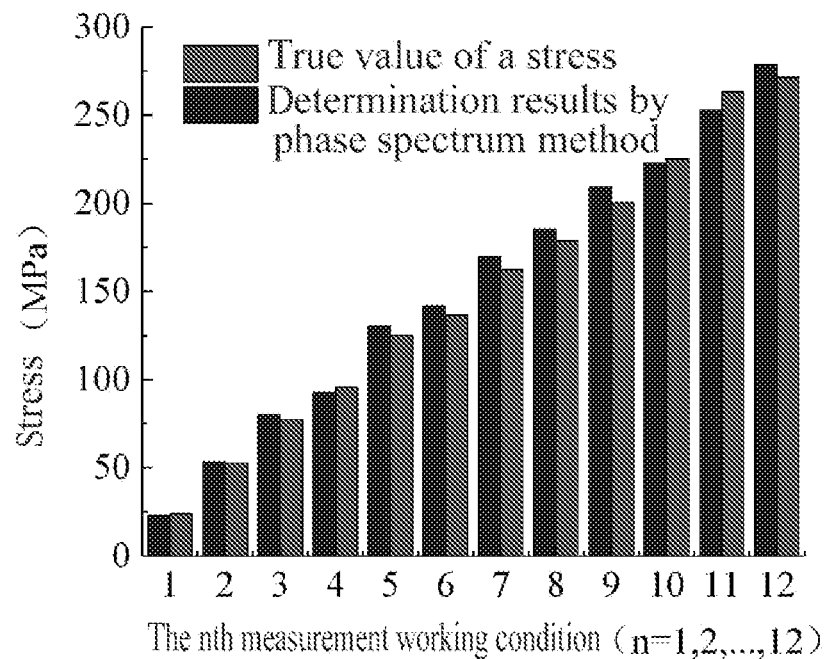
FIG. 13 is a column diagram showing the comparison between a determined uniaxial stress value and a true value of the stress of the steel plate A according to the disclosure.
Figure 14:
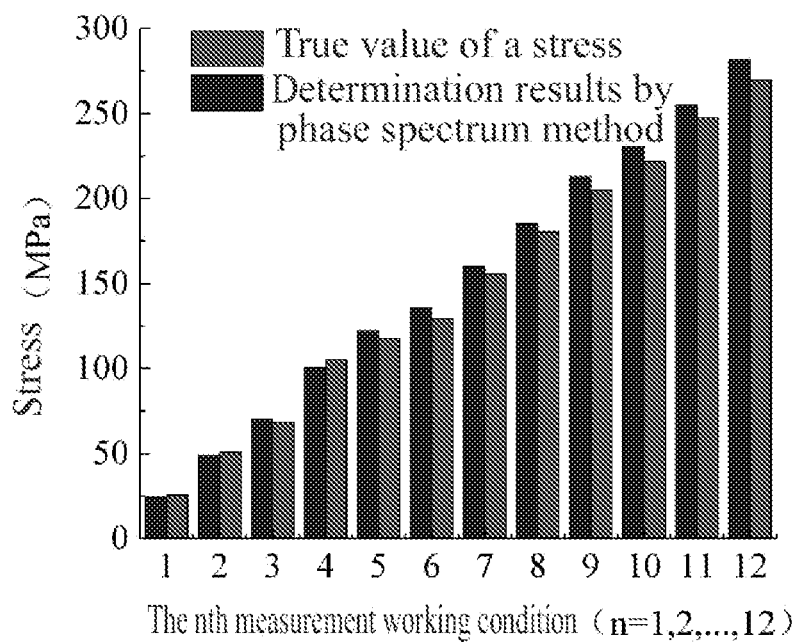
FIG. 14 is a column diagram showing the comparison between a determined uniaxial stress value and a true value of the stress of a steel plate B according to the disclosure.

In order to verify the accuracy of the stress results determined using the method (shown in Tables 4 and 5), a comparative test is carried out. In the above test, when two sets of loads are respectively applied to the steel plates A and B, the loading force of the testing machine is read to calculate the stress state of the member under each force. The obtained result is used as a real stress state of the member. The stress value obtained using the method for determining the uniaxial stress based on the phase spectrum of the ultrasonic wave is compared with the stress displayed on the universal testing machine for error analysis. The results are shown in Tables 6 and 7 and FIGS. 13 and 14.

It can be seen from Tables 6 and 7 that errors between the true value of the stress and the corresponding results obtained using the method for determining the uniaxial stress based on the phase spectrum provided by the disclosure are all below 5%, which indicates that the method for determining the uniaxial stress on the steel member provided by the disclosure has a certain reliability.

TABLE 6

Comparison between the test result of steel plate A and true value of the stress

| Stress obtained by ultrasonic method (MPa) | True value of stress (MPa) | Relative error % |
| --- | --- | --- |
| 23.2 | 24.3 | −4.53% |
| 53.3 | 52.5 | 1.52% |
| 80.4 | 77.6 | 3.61% |
| 92.7 | 95.8 | −3.24% |
| 130.4 | 124.9 | 4.40% |
| 141.6 | 136.6 | 3.66% |
| 170.1 | 162.2 | 4.87% |
| 185.4 | 178.5 | 3.87% |

TABLE 6-continued

Comparison between the test result of steel plate A and true value of the stress

| Stress obtained by ultrasonic method (MPa) | True value of stress (MPa) | Relative error % |
|---|---|---|
| 209.5 | 200.4 | 4.54% |
| 222.8 | 225.1 | −1.02% |
| 252.9 | 263.2 | −3.91% |
| 278.6 | 271.3 | 2.69% |

TABLE 7

Comparison between the test result of steel plate B and true value of the stress

| Results obtained by ultrasonic method (MPa) | True value of stress (MPa) | Relative error % |
|---|---|---|
| 24.3 | 25.5 | −4.71% |
| 48.9 | 50.7 | −3.55% |
| 70.3 | 68.2 | 3.08% |
| 100.5 | 105.4 | −4.65% |
| 122.3 | 117.5 | 4.09% |
| 135.6 | 129.3 | 4.87% |
| 160.1 | 155.6 | 2.89% |
| 185.2 | 180.4 | 2.66% |
| 212.8 | 205.1 | 3.75% |
| 230.4 | 221.7 | 3.92% |
| 255.1 | 247.6 | 3.03% |
| 281.9 | 269.8 | 4.48% |

The disclosure provides a method for determining internal uniaxial stress on a steel member based on the phase spectrum of the ultrasonic transverse wave, which enables the nondestructive determination of the absolute stress on the in-service steel member. The first response frequency of the phase spectrum is sensitive to stress and easy to capture, so the method has high precision. In addition, the method has the advantages of weak dependence on zero stress state information and certain resistance to environmental high frequency noise, suitable for the practical application.

In order to better understand the replicated steel member in the disclosure, the requirements of it are analyzed as follows.

Firstly, the replicated steel member is mainly used for the calibration of stress-spectrum parameters in the disclosure, and the stress-spectrum parameters are associated with the elastic coefficient of the material. Therefore, for the validity of the calibration of the stress-spectrum parameters, it is necessary to ensure that the replicated steel member is the same as the in-service steel member in the material.

On the other hand, if the thickness of the test member is different, the acoustic paths of the ultrasonic waves are different, resulting in difference in the acoustic time of the ultrasonic waves. In the theoretical formula of uniaxial stress determination, it can be found that there are some correlations between the stress-spectrum parameters and the acoustic time under zero-stress state. In order to explore the relationship between the thickness of the test member and the stress-spectrum parameters to clarify the requirements for the replicated steel member, the stress loading test is carried out on the steel members with different thicknesses in the disclosure concentrate on the relationship between the thickness l of the steel member and the fitting parameter k. The test solutions are described as follows.

(1) A steel block with the dimensions as shown in Table 8 is used as a test member, and a coupling agent is applied to the determination part of the steel member. The probe is fixed on the steel member, and the stress determination system is adjusted to obtain a stable ultrasonic signal.

(2) Respective test members varying in thickness are subjected to a stress loading test, and the obtained signals are processed to obtain the first response frequency of the phase spectrum and a corresponding stress value.

(3) The stress-spectrum parameters are calibrated to obtain a fitting straight line of the stress and the characteristic quantity of the phase spectrum, and then a parameter k is captured from the fitting straight line.

Figure 15:
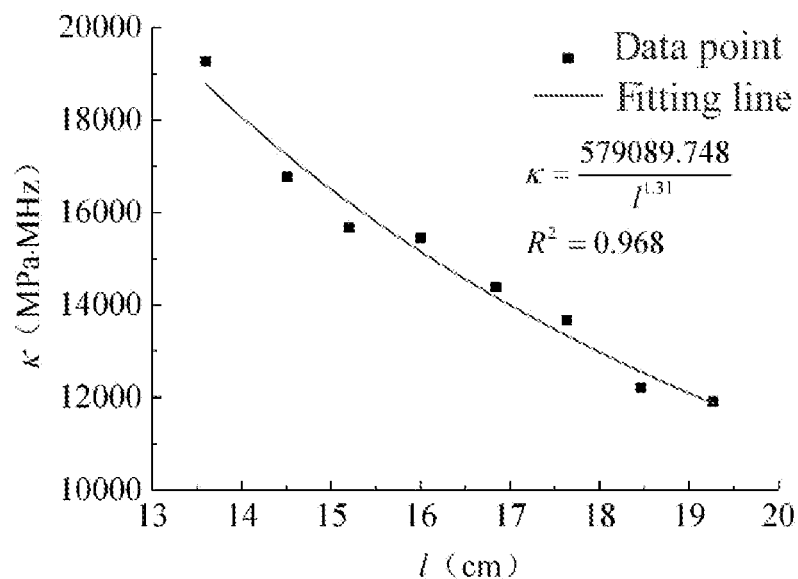
FIG. 15 schematically shows a relationship curve of the thickness l of steel members and the corresponding parameters k according to the disclosure.

(4) A rectangular coordinate system using the thickness l of the steel member as the horizontal coordinate and the fitting parameter k as the vertical coordinate is established, and the thickness l of the steel member and the corresponding fitting parameter k are respectively located in the coordinate system to fit a relation curve of the two, which is shown in FIG. 15.

TABLE 8

Thickness-series test steel member information

| Name | Material | Dimensions | Fitting parameter k |
|---|---|---|---|
| Test member 1 | 65# steel | 45.00 mm × 30.00 mm × 13.60 mm | 19262.6913 |
| Test member 2 | 65# steel | 45.00 mm × 30.00 mm × 14.51 mm | 16775.0144 |
| Test member 3 | 65# steel | 45.00 mm × 30.00 mm × 15.20 mm | 15676.1133 |
| Test member 4 | 65# steel | 45.00 mm × 30.00 mm × 16.00 mm | 15458.9942 |
| Test member 5 | 65# steel | 45.00 mm × 30.00 mm × 16.84 mm | 14384.7312 |
| Test member 6 | 65# steel | 45.00 mm × 30.00 mm × 17.63 mm | 13675.6843 |
| Test member 7 | 65# steel | 45.00 mm × 30.00 mm × 18.46 mm | 12211.1369 |
| Test member 8 | 65# steel | 45.00 mm × 30.00 mm × 19.27 mm | 11921.2582 |

In the formula (18) of Embodiment 1, the stress-spectrum parameter k is inversely proportional to the acoustic time of ultrasonic wave transmission under the zero-stress state. Since the acoustic time is in direct proportion to the thickness of the steel member, the stress-spectrum parameter k and the thickness of the steel member should be in inverse proportion, which is consistent with the relationship shown in FIG. 15. In other words, the stress-spectrum parameter k is reduced over the increase in the thickness of the steel member, which reflects that the theoretical basis of the method provided by the disclosure has a certain accuracy.

It can be found from the fitting results in FIG. 15 that the thickness of the steel member is not in absolute inverse proportional to the stress-spectrum parameter, which may be caused by a certain deviation produced in the parameter calibration process due to test errors. In addition, in the loading process, slight change may happen to the test member in the thickness, which may have an influence on the fitting curve. However, the overall trend of the fitting result of the test data is consistent with the theoretical analysis, which demonstrates that the conclusion has certain effectiveness.

In conclusion, in order to ensure the accuracy and effectiveness of the stress-spectrum parameters, the material and thickness of the replicated steel member need to be consistent with those of the in-service steel member.

The requirements in the disclosure for the sampling rate of the oscilloscope are specified as follows.

The uniaxial stress is measured herein by capturing the characteristic quantity in the derived curve of the phase difference, which requires that the obtained derived curve of the phase difference has a certain accuracy, that is, the derivation function of the phase spectrum obtained by the phase spectrum is close to the real situation. In the mathematical processing of the disclosure, a real derivative value is replaced with a slope of the secant formed between the two sample points, so in order to ensure that the capture of the first response frequency of the phase spectrum and the calibration of the stress-spectrum parameters are accurate and effective, the conditions which the oscilloscope sampling rate needs to meet are required to be determined when the phase spectrum is adopted for uniaxial stress determination.

A test is performed as follows to solve the problems mentioned above.

(1) A steel plate A is selected as an object for the determination, and the ultrasonic probe is fixed on the steel plate using a coupling agent.

(2) The steel plate is calibrated y utilizing a universal testing machine, where when each stress is applied on the steel member, the sampling rates of the oscilloscope are respectively adjusted to 250 MSa/s, 500 MAa/s, 1 GSa/s and 2.5 GSa/s to collect data, obtaining corresponding ultrasonic echo signals. After the test is completed, each sampling rate corresponds to one set of signal data.

Figure 16:
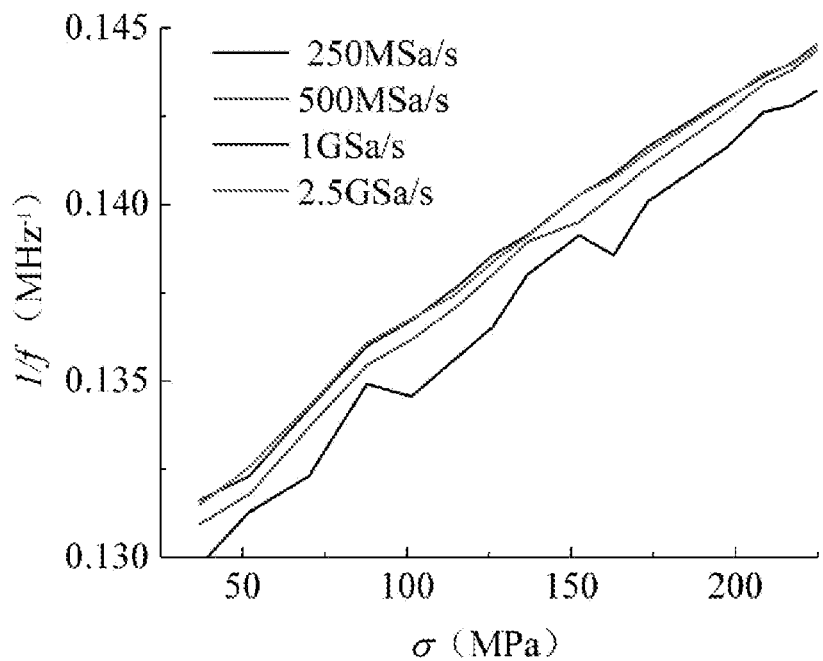
FIG. 16 schematically shows relationship curves between the first response frequency and the corresponding stress at different sampling rates according to the disclosure.

(3) The four sets of ultrasonic echo data is processed to obtain a relation curve of the reciprocal of the first response frequency and the stress of the steel member, obtaining four curves as shown in FIG. 16.

As shown in FIG. 16, as the sampling rate is increased, the linear relationship between the first response frequency of the phase spectrum and the stress is stronger, and with the increase of the sampling rate, the curves are gradually overlapped. When the sampling rate of the oscilloscope is larger than 1 GSa/s, the two curves are substantially overlapped, indicating that the obtained result is more and more stable and the parameter calibration in the theoretical formula of the uniaxial stress determination is more accurate. Such results indicate that the accuracy of the stress determination can be improved by increasing the sampling rate, and a stable parameter value can be obtained with the sampling rate larger than 1 GSa/s.

Figure 17:
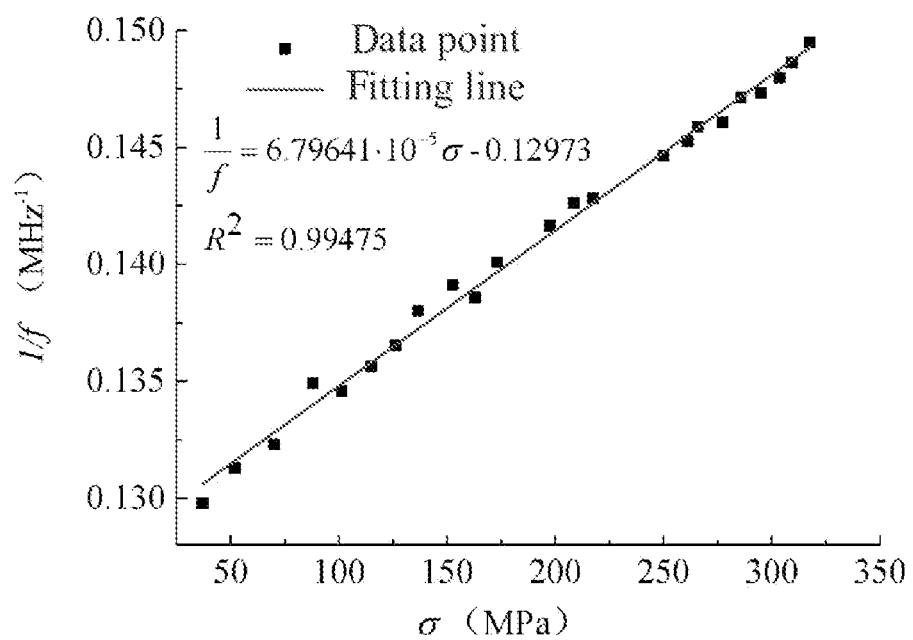
FIG. 17 schematically shows a fitting curve of the first response frequency and the corresponding stress at a sampling rate of 250 MSa/s according to the disclosure.

In order to more clearly understand the influence of sampling rate on the fitting parameters, the four sets of data obtained from the above test are respectively fitted by least square method, where the fitting result obtained at the sampling rate of 250 MSa/s is shown in FIG. 17. It can be seen from FIG. 17 that even if the sampling rate is at a lower level, the fitting result of the reciprocal of the first response frequency of the phase spectrum and the stress still shows a good linear relationship (the determination coefficient is close to 1).

When the sampling rate is increased, the linear relation is better, which indicates that the precision of the determination result of the test can be improved by increasing the sampling rate of the oscilloscope. From another aspect, when the sampling rate reaches a certain level, with the continuous increase of the sampling rate, the obtained fitting straight lines are basically overlapped, which indicates that the spectrum-stress parameters tend to be stable only in the case of a high sampling rate. Therefore, in order to ensure the accuracy of the stress result obtained using the method for determining the uniaxial stress of the steel member based on the phase spectrum, the sampling rate should be larger than 1 GSa/s.

The stress determination method provided by the disclosure has high precision, strong adaptability, simple systems and simple operation, so that it can be used to determine the absolute stress of steel structure building members under construction and in service, determining the stress state of the key members to ensure the safety. Therefore, once a safety risk appears, maintenance and reinforcement measures can be taken in time to avoid serious safety accidents.

It should also be noted that the exemplary embodiments mentioned in the disclosure are based on a series of steps or devices to describe some methods or systems. However, the disclosure is not limited to the order of the above steps, that is, the steps may be performed in the order mentioned in the embodiments, or may also be performed in an order different from the embodiments or be performed at the same time.

The embodiments mentioned above can be referred by each other, and this embodiment is not intended to limit other embodiments.

Finally, it should be noted that, the embodiments mentioned above are only used to illustrate the technical solutions of the disclosure, but are not intended to limit the disclosure. Although the disclosure has been described in detail with reference to the embodiments, it should be understood by those skilled in the art that the technical solutions described in the embodiments can still be modified, or equivalent replacement can be made to some or all of the technical features therein. The modifications or replacements made without departing from the spirit of the disclosure should still fall within the scope of the disclosure.

What is claimed is:

1. A method for determining internal uniaxial stress of a steel member based on phase spectrum of ultrasonic transverse wave, comprising steps of:

(1) manufacturing a replicated steel member of an in-service steel structure member; wherein the replicated steel member and the in-service steel structure member are the same in material and thickness;

(2) loading a test on the replicated steel member to obtain two stress-spectral parameters (3) performing ultrasonic determination on the in-service steel structure member using an ultrasonic wave determination device; and collecting transverse wave signals using a signal acquisition system; and (4) processing the collected transverse wave signals through an information processing device; and obtaining a uniaxial stress of the in-service steel structure member according to the two stress-spectral parameters;

wherein step (4) comprises steps of:

(4-1) processing the transverse wave signals to obtain a derived curve of the phase spectrum;

(4-2) capturing a frequency corresponding to a first maximum value point in the derived curve of the phase spectrum; and taking the captured frequency as a first response frequency of the phase spectrum; and (4-3) obtaining the uniaxial stress of the in-service steel structure member according to the two stress-spectral parameters and the first response frequency of the phase spectrum.

2. The method of claim 1, wherein step (4-3) comprises:
obtaining the uniaxial stress σ of the in-service steel structure member according to Formula 1;
wherein the Formula 1 is shown as follows $$\sigma = \frac{k}{f_{max}} - c;$$

where, k and c are the two stress-spectrum parameters, k MPa·MHz; and c, MPa;
$f_{max}$ is a value of the first response frequency of the phase spectrum, MHz; and σ, MPa.

3. The method of claim 1, wherein step (4-1) comprises:
collecting time domain signals of the transverse wave signals; performing Fourier transform on the time domain signals to obtain an echo phase spectrum; and performing signal processing on the echo phase spectrum to obtain the derived curve of the phase spectrum.

4. The method of claim 1, wherein in step (3), the ultrasonic wave determination device comprises an ultrasonic pulse emitter and receiver and an ultrasonic transverse wave probe; wherein the ultrasonic transverse wave probe is connected with the ultrasonic pulse emitter and receiver;
the ultrasonic transverse wave probe is capable of emitting and receiving a transverse wave;
an included angle formed between a direction of the transverse wave emitted from the ultrasonic transverse wave probe and a uniaxial direction of the in-service steel structure member is close to π/4, but not equal to π/4.

5. The method of claim 4, wherein pulse signals emitted from the ultrasonic pulse emitter and receiver are processed by the ultrasonic transverse wave probe to generate the transverse wave signals; the transverse wave signals are transmitted in the in-service steel structure member and reflected to be received by the ultrasonic transverse wave probe;
the ultrasonic pulse emitter and receiver is further connected with an oscilloscope; and the ultrasonic transverse wave probe converts the ultrasonic wave signals into echo signals which are then transmitted to the oscilloscope by the ultrasonic pulse emitter and receiver.

6. The method of claim 5, wherein the ultrasonic transverse wave probe has a center frequency of 5 MHz and a bandwidth of 0-10 MHz; and a sampling rate of the oscilloscope is greater than 1 GSa/s.

7. The method of claim 1, wherein the in-service steel structure member has opposite end surfaces;
the uniaxial stress of the in-service steel structure member is an absolute stress of the in-service steel structure member in a real-time state.

* * * * *